United States Patent
Yang et al.

(10) Patent No.: US 9,966,010 B2
(45) Date of Patent: May 8, 2018

(54) DRIVING CIRCUIT AND DRIVING METHOD FOR CONTROLLING TOUCH-CONTROL DRIVING TIME

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Panhua Wang, Beijing (CN); Hailin Xue, Beijing (CN); Xiaochuan Chen, Beijing (CN); Haisheng Wang, Beijing (CN); Xi Chen, Beijing (CN); Jianyun Xie, Beijing (CN); Yingming Liu, Beijing (CN); Weijie Zhao, Beijing (CN); Hongjuan Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days. days.

(21) Appl. No.: 15/326,766

(22) PCT Filed: Mar. 24, 2016

(86) PCT No.: PCT/CN2016/077192
§ 371 (c)(1),
(2) Date: Jan. 17, 2017

(87) PCT Pub. No.: WO2017/045389
PCT Pub. Date: Mar. 23, 2017

(65) Prior Publication Data
US 2017/0330516 A1    Nov. 16, 2017

(30) Foreign Application Priority Data
Sep. 18, 2015   (CN) .......................... 2015 1 0600324

(51) Int. Cl.
G09G 3/3266 (2016.01)
G09G 3/3258 (2016.01)
G06F 3/041 (2006.01)

(52) U.S. Cl.
CPC ......... G09G 3/3266 (2013.01); G06F 3/0412 (2013.01); G06F 3/0416 (2013.01);
(Continued)

(58) Field of Classification Search
CPC .................................................. G09G 3/3266
See application file for complete search history.

(56) References Cited

U.S. PATENT DOCUMENTS

2004/0252112 A1   12/2004   Fukuda et al.
2008/0204397 A1*   8/2008   Jang ..................... G09G 3/3426
                                                                345/102

(Continued)

FOREIGN PATENT DOCUMENTS

CN   102110406 A   6/2011
CN   104078015 A   10/2014

(Continued)

OTHER PUBLICATIONS

Apr. 20, 2017—(CN) First Office Action Appn 201510600324.3 with English Tran.

(Continued)

*Primary Examiner* — William Boddie
*Assistant Examiner* — Andrew Schnirel
(74) *Attorney, Agent, or Firm* — Banner & Witcoff, Ltd.

(57) ABSTRACT

Provided are a driving circuit and a driving method thereof, a touch display panel, and a touch display device. The first input terminal of the delay unit is connected to corresponding previous gate driver, the first output terminal of the delay unit is connected to corresponding subsequent gate driver. The delay unit outputs a starting signal to the subsequent (Continued)

gate driver for enabling it after a predetermined time elapses since the previous gate driver outputs a driving signal. The delay unit achieves shift registering between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

17 Claims, 4 Drawing Sheets

(52) U.S. Cl.
CPC ... *G09G 3/3258* (2013.01); *G09G 2300/0842* (2013.01); *G09G 2300/0871* (2013.01); *G09G 2310/0286* (2013.01); *G09G 2310/08* (2013.01)

(56) References Cited

U.S. PATENT DOCUMENTS

| | | | | |
|---|---|---|---|---|
| 2008/0238844 | A1* | 10/2008 | Kakiuchi | G09G 3/3611 345/87 |
| 2010/0328281 | A1* | 12/2010 | Okada | G11C 19/184 345/206 |
| 2014/0055177 | A1* | 2/2014 | Chen | G09G 3/38 327/142 |
| 2015/0091822 | A1* | 4/2015 | Dong | G06F 3/0416 345/173 |
| 2016/0180817 | A1* | 6/2016 | Cho | G09G 3/20 345/213 |
| 2017/0124976 | A1* | 5/2017 | Chen | G09G 3/3677 |

FOREIGN PATENT DOCUMENTS

| | | |
|---|---|---|
| CN | 104820520 A | 8/2015 |
| CN | 104835466 A | 8/2015 |
| CN | 105070244 A | 11/2015 |

OTHER PUBLICATIONS

Jun. 7, 2016—International Search Report and Written Opinion Appn PCT/CN2016/077192 with Eng Tran.

* cited by examiner

DRIVING CIRCUIT AND DRIVING METHOD FOR CONTROLLING TOUCH-CONTROL DRIVING TIME

The application is a U.S. National Phase Entry of International Application No. PCT/CN2016/077192 filed on Mar. 24, 2016, designating the United States of America and claiming priority to Chinese Patent Application No. 201510600324.3 filed on Sep. 18, 2015. The present application claims priority to and the benefit of the above-identified applications and the above-identified applications are incorporated by reference herein in their entirety.

TECHNICAL FIELD

The present disclosure relates to the field of displaying technique, and more particularly, to a driving circuit and a driving method thereof, a touch display panel, and a touch display device.

BACKGROUND

An operating process of a touch display panel in the prior art includes a display phase and a touch-control phase, wherein the touch-control phase is set within a blank time period between display phases of two adjacent frames of pictures. In the display panel in the prior art, in order to improve resolution of the display panel, the blank time period between display phases of two adjacent frames of pictures is shortened, which results in that the blank time period between display phases of two adjacent frames of pictures cannot satisfy the time required by the touch-control phase that performs touch-control driving within the aforesaid blank time period.

SUMMARY

In order to solve the above problem, the embodiments of the present disclosure provide a driving circuit and a driving method thereof, a touch display panel, and a touch display device, for solving the problem that the touch display panel cannot satisfy the time requirement by the touch-control phase that performs touch-control driving as existed in the prior art.

To this end, an embodiment of the present disclosure provides a driving circuit, comprising a plurality of gate drivers and a plurality of delay units, each of the plurality of gate drivers including at least one shift register. Each of the plurality of delay units is disposed between two adjacent gate drivers among the plurality of gate drivers, a first input terminal of each delay unit is connected to a previous gate driver of the two adjacent gate drivers, a first output terminal of each delay unit is connected to a subsequent gate driver of the two adjacent gate drivers, each delay unit is provided with a first voltage terminal and a first control terminal. Each delay unit is configured to output a starting signal for enabling the subsequent gate driver to the subsequent gate driver after a predetermined time elapses since the previous gate driver outputs a driving signal, the predetermined time is used for touch-control driving.

Each delay unit may comprise an input module and an output module. The input module is respectively connected to the first input terminal, the first voltage terminal, and a first node of a respective delay unit, and configured to control a potential of the first node according to signals inputted from the first input terminal and the first voltage terminal. The output module is respectively connected to the first node, the first control terminal, and the first output terminal of the respective delay unit, and configured to control a signal outputted from the first output terminal according to a signal inputted from the first control terminal under control of the potential of the first node.

The input module may comprise a first transistor. A gate of the first transistor is connected to the first input terminal of the respective delay unit, a first electrode of the first transistor is connected to the first voltage terminal of the respective delay unit, and a second electrode of the first transistor is connected to the first node of the respective delay unit.

The output module may comprise a second transistor and a first capacitor. A gate of the second transistor is connected to the first node of the respective delay unit, a first electrode of the second transistor is connected to the first control terminal of the respective delay unit, and a second electrode of the second transistor is connected to the first output terminal of the respective delay unit. A first terminal of the first capacitor is connected to the gate of the second transistor, and a second terminal of the first capacitor is connected to the second electrode of the second transistor.

Each shift register may comprise a starting signal input terminal and a signal output terminal, the signal output terminal performs an output according to a signal provided by the starting signal input terminal, and as to the two adjacent gate drivers, the signal output terminal of the shift register of the previous gate driver is connected to the first input terminal of the delay unit corresponding to the two adjacent gate drivers, a starting signal input terminal of the shift register of the subsequent gate driver is connected to the first output terminal of the delay unit corresponding to the two adjacent gate drivers.

Each of the plurality of gate drivers may comprise a first output terminal, a second output terminal, and a third output terminal. A first output terminal of a previous gate driver of the two adjacent gate drivers is connected to the first input terminal of the delay unit corresponding to the two adjacent gate drivers. Each of the plurality of gate drivers is configured to drive a pixel circuit, the pixel circuit including a third transistor, a fourth transistor, a fifth transistor, a sixth transistor, a seventh transistor, an eighth transistor, a second capacitor, and a light emitting device. A gate of the third transistor is connected to the second output terminal of each of the plurality of gate drivers, a first electrode of the third transistor is connected to an initialization signal input terminal of the pixel circuit, and a second electrode of the third transistor is connected to a second node of the pixel circuit. A gate of the fourth transistor is connected to the first output terminal of each of the plurality of gate drivers, a first electrode of the fourth transistor is connected to the second node of the pixel circuit, and a second electrode of the fourth transistor is connected to a sixth node of the pixel circuit. A gate of the fifth transistor is connected to the second node of the pixel circuit, a first electrode of the fifth transistor is connected to a fifth node of the pixel circuit, and a second electrode of the fifth transistor is connected to the sixth node of the pixel circuit. A gate of the sixth transistor is connected to the third output terminal of each of the plurality of gate drivers, a first electrode of the sixth transistor is connected to a first power supply terminal of the pixel circuit, and a second electrode of the sixth transistor is connected to the fifth node of the pixel circuit. A gate of the seventh transistor is connected to the first output terminal of each of the plurality of gate drivers, a first electrode of the seventh transistor is connected to a data input terminal of the pixel circuit, and a second electrode of the seventh transistor is connected to the fifth node of the pixel circuit. A gate of the eighth transistor is connected to the third output terminal of each of the plurality of gate drivers, a first electrode of the eighth transistor is connected to the sixth node of the pixel circuit, and a second electrode of the eighth transistor is connected to a first terminal of the light emitting device. A first terminal of the second capacitor is connected to the second node of the pixel circuit, and a second terminal of the second capacitor is connected to the first power supply terminal of the pixel circuit. A second terminal of the light emitting device is connected to a second power supply terminal of the pixel circuit.

Each of the first transistor to the eighth transistor may be a P-type transistor.

An embodiment of the present disclosure further provides a touch display panel, comprising any of the driving circuit described above.

An embodiment of the present disclosure further provides a touch display device, comprising the touch display panel described above.

An embodiment of the present disclosure further provides a driving method of a driving circuit, the driver circuit comprising any of the driving circuit described above, wherein the first voltage terminal is at a low voltage level, the driving method comprises a first phase, a second phase, and a third phase. In the first phase, the previous gate driver outputs a low voltage level, the first control terminal is inputted with a high voltage level, and the subsequent gate driver outputs a high voltage level. In the second phase, the previous gate driver outputs a synchronous driving signal, the first control terminal is inputted with a low voltage level, and the subsequent gate driver outputs a synchronous driving signal. In the third phase, the previous gate driver outputs a high voltage level, the first control terminal is inputted with a high voltage level, and the subsequent gate driver outputs a low voltage level.

A touch-control phase may be further comprised between the first phase and the second phase. In the touch-control phase, the previous gate driver outputs a synchronous driving signal, the first control terminal is inputted with a high voltage level, and the subsequent gate driver outputs a synchronous driving signal, a duration of the touch-control phase is the predetermined time.

The synchronous driving signal may be the same as a touch-control driving signal.

The present disclosure has the following advantageous technical effects:

In the driving circuit and driving method thereof, touch display panel, and touch display device provided by the embodiments of the present disclosure, the first input terminal of the delay unit is connected to the corresponding previous gate driver, the first output terminal of the delay unit is connected to the corresponding subsequent gate driver. The delay unit outputs a starting signal for enabling the subsequent gate driver to the subsequent gate driver after a predetermined time elapses since the previous gate driver outputs a driving signal. The delay unit provided by the embodiments of the present disclosure achieves shift registering with interval time between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

DETAILED DESCRIPTION OF THE EMBODIMENTS

For those skilled in the art to better understand the technical solutions of the present disclosure, hereinafter, the driving circuit and driving method thereof, touch display panel, and touch display device provided by the present disclosure will be described in detail in connection with the drawings attached thereto.

First Embodiment

Figure 1:
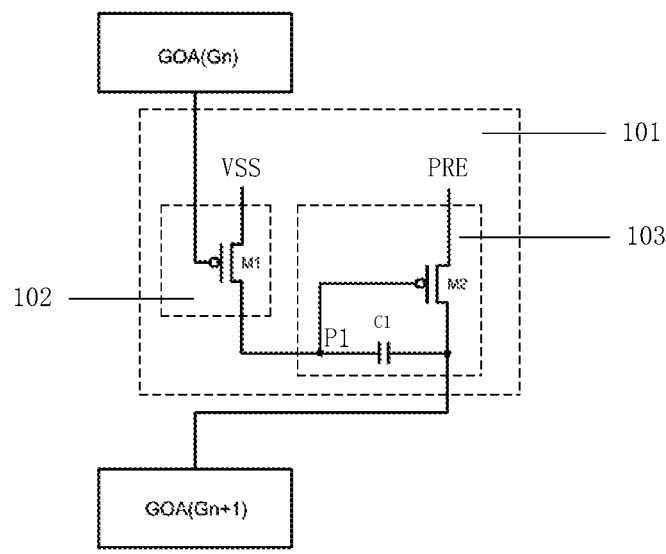
FIG. 1 is a schematic diagram of structure of a driving circuit provided by a first embodiment of the present disclosure.

FIG. 1 is a schematic diagram of structure of a driving circuit provided by a first embodiment of the present disclosure. As shown in FIG. 1, the driving circuit comprises a plurality of gate drivers GOA, a delay unit 101 is provided between two adjacent gate drivers GOA (Gn) and GOA (Gn+1), and each gate driver comprises at least one shift register, a first input terminal of the delay unit 101 is connected to a previous gate driver GOA (Gn) of the two adjacent gate drivers, a first output terminal of the delay unit 101 is connected to a subsequent gate driver GOA (Gn+1) of the two adjacent gate drivers, the delay unit 101 is provided with a first voltage terminal VSS and a first control terminal PRE. The delay unit 101 is configured to output a starting signal for enabling the subsequent gate driver GOA (Gn+1) to the subsequent gate driver GOA (Gn+1) after a predetermined time elapses since the previous gate driver GOA (Gn) outputs a driving signal, so that shift registering with interval time (i.e., the predetermined time) can be achieved between the previous gate driver GOA (Gn) and the subsequent gate driver GOA (Gn+1), in this way, a touch-control time period can be formed between outputting a driving signal by the previous gate driver GOA (Gn) and enabling the subsequent gate driver GOA (Gn+1), so as to ensure that the touch display panel can also achieve a touch-control function with high precision on the premise of achieving a display function of high resolution.

In this embodiment, each of the plurality of gate drivers GOA comprises only one shift register, that is to say, the delay unit 101 is disposed between adjacent shift registers. In comparison to the situation that one delay unit 101 is disposed as spaced between a plurality of shift registers, disposing one delay unit 101 between adjacent shift registers can make the touch display panel have more touch-control driving time, so as to ensure that the touch display panel can also achieve a touch-control function with high precision on the premise of achieving a display function of high resolution. Of course, the gate driver GOA may also comprise a plurality of shift registers, so as to adapt to requirements of different applications.

Referring to FIG. 1, the delay unit 101 comprises an input module 102 and an output module 103. The input module 102 is respectively connected to the first input terminal, the first voltage terminal VSS, and a first node P1 of the delay unit 101, and configured to control a potential of the first node P1 according to signals inputted from the first input terminal and the first voltage terminal VSS. The output module 103 is respectively connected to the first node P1, the first control terminal PRE, and the first output terminal of the delay unit 101, and configured to control a signal outputted from the first output terminal according to a signal inputted from the first control terminal PRE under control of the potential of the first node P1.

In this embodiment, the input module 102 comprises a first transistor M1, a gate of the first transistor M1 is connected to the first input terminal of the delay unit 101, a first electrode of the first transistor M1 is connected to the first voltage terminal VSS of the delay unit 101, and a second electrode of the first transistor M1 is connected to the first node P1 of the delay unit 101. The output module 103 comprises a second transistor M2 and a first capacitor C1; a gate of the second transistor M2 is connected to the first node P1 of the delay unit 101, a first electrode of the second transistor M2 is connected to the first control terminal PRE of the delay unit 101, and the second electrode of the second transistor M2 of the second transistor is connected to the first output terminal of the delay unit 101; a first terminal of the first capacitor C1 is connected to the gate of the second transistor M2, and a second terminal of the first capacitor C1 is connected to the second electrode of the second transistor M2.

Figure 2:
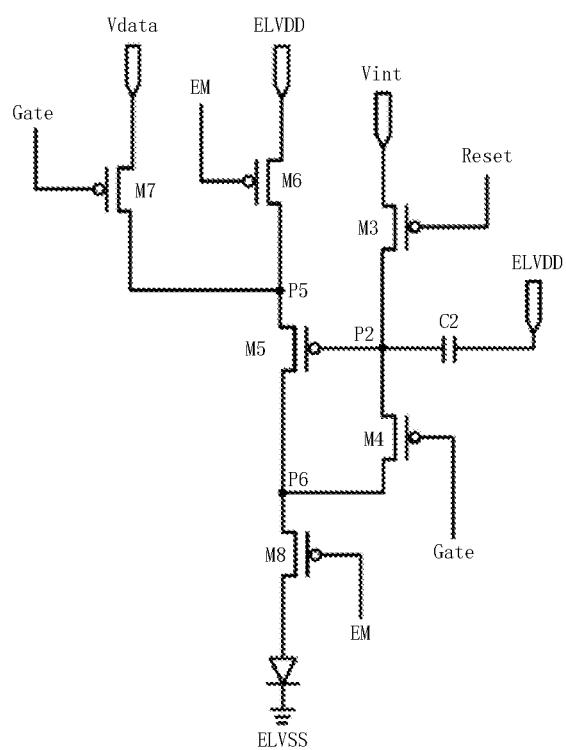
FIG. 2 is a schematic diagram of structure of a pixel circuit provided by the first embodiment of the present disclosure.
Figure 3:
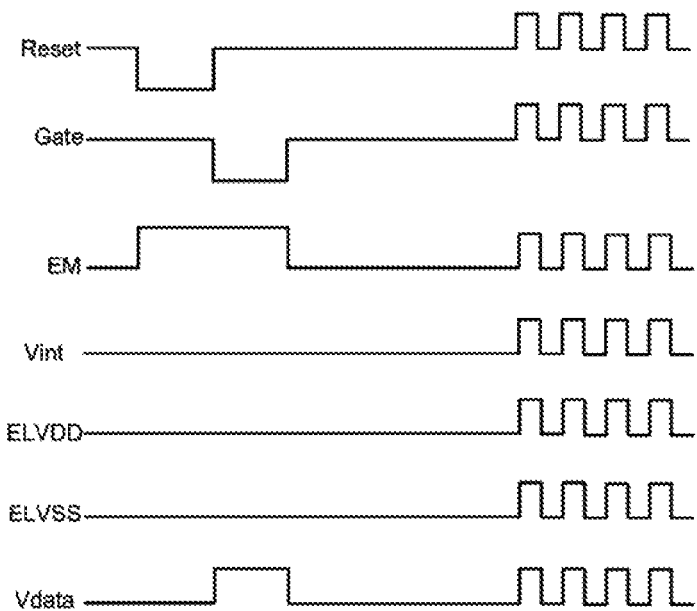
FIG. 3 is an operating timing diagram of the pixel circuit shown in FIG. 2.

The gate driver GOA in this embodiment is used to provide a gate driving signal for a pixel circuit. FIG. 2 is a schematic diagram of structure of a pixel circuit that is provided with a gate driving signal through the gate driver GOA in the driving circuit according to the first embodiment of the present disclosure, FIG. 3 is an operating timing diagram of the pixel circuit shown in FIG. 2.

As shown in FIG. 2, the pixel circuit comprises a third transistor M3, a fourth transistor M4, a fifth transistor M5, a sixth transistor M6, a seventh transistor M7, an eighth transistor M8, a second capacitor C2, and a light emitting device. A gate of the third transistor M3 is connected to a reset control terminal Reset of the pixel circuit, a first electrode of the third transistor M3 is connected to an initialization signal input terminal Vint of the pixel circuit, and a second electrode of the third transistor M3 is connected to a second node P2 of the pixel circuit. A gate of the fourth transistor M4 is connected to a gate control terminal Gate of the pixel circuit, a first electrode of the fourth transistor M4 is connected to the second node P2 of the pixel circuit, and a second electrode of the fourth transistor M4 is connected to a sixth node P6 of the pixel circuit. A gate of the fifth transistor M5 is connected to the second node P2 of the pixel circuit, a first electrode of the fifth transistor M5 is connected to a fifth node P5 of the pixel circuit, and a second electrode of the fifth transistor M5 is connected to the sixth node P6 of the pixel circuit. A gate of the sixth transistor M6 is connected to a third control terminal EM of the pixel circuit, a first electrode of the sixth transistor M6 is connected to the first power supply terminal ELVDD of the pixel circuit, and a second electrode of the sixth transistor M6 is connected to the fifth node P5 of the pixel circuit. A gate of the seventh transistor M7 is connected to the gate control terminal Gate of the pixel circuit, a first electrode of the seventh transistor M7 is connected to a data input terminal Vdata of the pixel circuit, and a second electrode of the seventh transistor M7 is connected to the fifth node P5 of the pixel circuit. A gate of the eighth transistor M8 is connected to the third control terminal EM of the pixel circuit, a first electrode of the eighth transistor M8 is connected to the sixth node P6 of the pixel circuit, and a second electrode of the eighth transistor M8 is connected to a first terminal of the light emitting device. A first terminal of the second capacitor C2 is connected to the second node P2 of the pixel circuit, and a second terminal of the second capacitor C2 is connected to the first power supply terminal ELVDD of the pixel circuit. A second terminal of the light emitting device is connected to a second power supply terminal ELVSS of the pixel circuit. In this embodiment, the fifth transistor M5 is a driving transistor, the other transistors are a switching transistor each.

Next, an operating process of the pixel circuit shown in FIG. 2 will be described in combination with FIGS. 2 and 3. Specifically, referring to FIGS. 2 and 3, in a first phase, that is, when a signal at the reset control terminal Reset is at a low voltage level, a signal at the gate control terminal Gate is at a high voltage level, a signal at the third control terminal EM is at a high voltage level, a signal at the initialization signal input terminal Vint is at a low voltage level, a signal at the first power supply terminal ELVDD is at a low voltage level, a signal at the second power supply terminal ELVSS is at a low voltage level, and a signal at the data input terminal Vdata is at a low voltage level, then the third transistor M3 is turned on, a voltage signal at the second node is reset. In a second phase, that is, when a signal at the reset control terminal Reset is at a high voltage level, a signal at the gate control terminal Gate is at a low voltage level, a signal at the third control terminal EM is at a high voltage level, a signal at the initialization signal input terminal Vint is at a low voltage level, a signal at the first power supply terminal ELVDD is at a low voltage level, a signal at the second power supply terminal ELVSS is at a low voltage level, and a signal at the data input terminal Vdata is at a high voltage level, then the fourth transistor M4, the fifth transistor M5, and the seventh transistor M7 are turned on, the second transistor M3, the sixth transistor M6, and the eighth transistor M8 are turned off. In this phase, the signal at the data input terminal Vdata charges the second node P2 through the seventh transistor M7, the fifth transistor M5, and the fourth transistor M4.

In a third phase, that is, when a signal at the reset control terminal Reset is at a high voltage level, a signal at the gate control terminal Gate is at a high voltage level, a signal at the third control terminal EM is at a low voltage level, a signal at the initialization signal input terminal Vint is at a low voltage level, a signal at the first power supply terminal ELVDD is at a low voltage level, a signal at the second power supply terminal ELVSS is at a low voltage level, and a signal at the data input terminal Vdata is at a low voltage level, then the fifth transistor M5, the sixth transistor M6, and the eighth transistor M8 are turned on, the light emitting device OLED starts to emit light. In this case, an operating current $I_{OLED}$ of the light emitting device OLED is not affected by a threshold voltage $V_{th}$ of the fifth transistor M5 (i.e., the driving transistor), and it is only related to a voltage signal Vdd provided by the first power supply terminal ELVDD and a voltage of a signal provided by the data input terminal Vdata, so that the problem of drifting of the threshold voltage $V_{th}$ of the driving transistor is solved, and the affect caused by the threshold voltage $V_{th}$ of the driving transistor on the operating current of the light emitting device OLED is removed. In a fourth phase (i.e., the touch-control phase), when the signal at the reset control terminal Reset, the signal at the gate control terminal Gate, the signal at the third control terminal EM, the signal at the initialization signal input terminal Vint, the signal at the first power supply terminal ELVDD, the signal at the second power supply terminal ELVSS, and the signal at the data input terminal Vdata are synchronous driving signals, the aforesaid signals synchronously drive along with touch-control electrodes, to ensure that the operating current of the light emitting device OLEM is consistent with that in a normal light emitting status, and further ensures that the touch-control driving in the touch-control phase does not have any affect on light emitting of the light emitting device OLED at all.

The gate driver GOA in this embodiment provides a control signal to the pixel circuit shown in FIG. 2, so as to implement the above operating process. Specifically, the gate driver GOA may comprise a first output terminal, a second output terminal, and a third output terminal, wherein the first output terminal is connected to the gate control terminal Gate of the pixel circuit, the second output terminal is connected to the reset control terminal Reset of the pixel circuit, and the third output terminal is connected to the third control terminal EM of the pixel circuit. The first output terminal of the gate driver GOA is further connected to the first input terminal of the delay unit 101.

Figure 4:
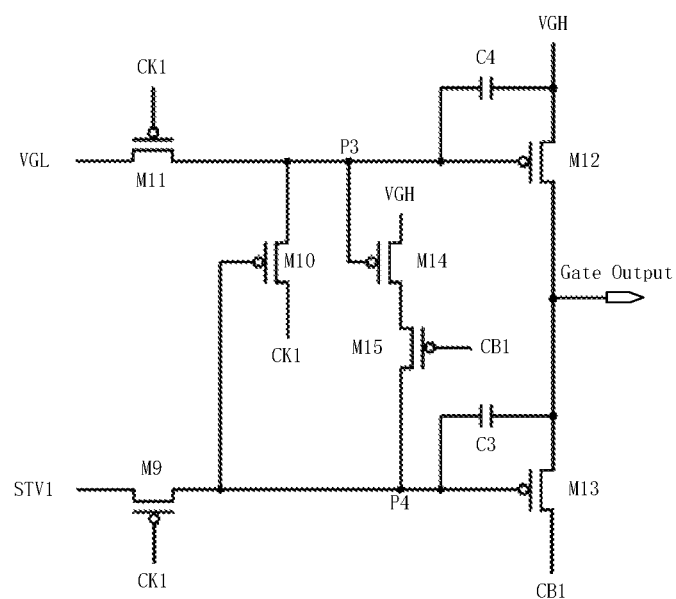
FIG. 4 is a schematic diagram of structure of a shift register provided by the first embodiment of the present disclosure.
Figure 5:
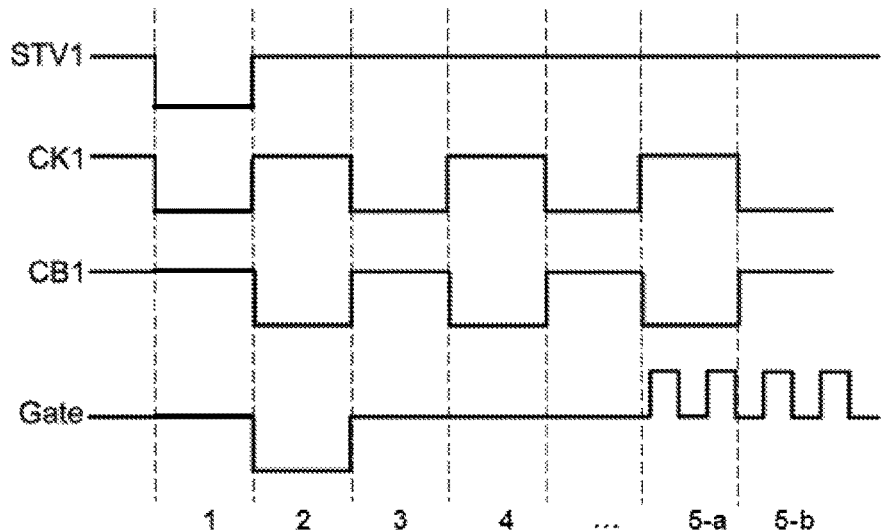
FIG. 5 is an operating timing diagram of the shift register shown in FIG. 4.

As described above, the gate driver GOA provided by the first embodiment of the present disclosure comprises a shift register. FIG. 4 is a schematic diagram of structure of a shift register that can be applied to the gate driver GOA according to the first embodiment of the present disclosure, FIG. 5 is an operating timing diagram of the shift register shown in FIG. 4. As shown in FIG. 4, the shift register comprises a ninth transistor M9, a tenth transistor M10, an eleventh transistor M11, a twelfth transistor M12, a thirteenth transistor M13, a fourteenth transistor M14, a fifteenth transistor M15, a third capacitor C3, and a fourth capacitor C4. A gate of the ninth transistor M9 is connected to a clock signal terminal CK1, a first electrode of the ninth transistor M9 is connected to a starting signal input terminal STV1, and a second electrode of the ninth transistor M9 is connected to a fourth node M4. A gate of the tenth transistor M10 is connected to the fourth node P4, a first electrode of the tenth transistor M10 is connected to the clock signal terminal CK1, and a second electrode of the tenth transistor M10 is connected to the third node P3. A gate of the eleventh transistor M11 is connected to the clock signal terminal CK1, a first electrode of the eleventh transistor M11 is connected to the second voltage terminal VGL, and a second electrode of the eleventh transistor M11 is connected to the third node P3. A gate of the twelfth transistor M12 is connected to the third node P3, a first electrode of the twelfth transistor M12 is connected to a third voltage terminal VGH, and a second electrode of the twelfth transistor M12 is connected to the signal output terminal Gate Output. A gate of the thirteenth transistor M13 is connected to the fourth node P4, a first electrode of the thirteenth transistor M13 is connected to the signal output terminal Gate Output, and a second electrode of the thirteenth transistor M13 is connected to the second signal terminal CB1. A gate of the fourteenth transistor M14 is connected to the third node P3, a first electrode of the fourteenth transistor M14 is connected to the third voltage terminal VGH, and a second electrode of the fourteenth transistor M14 is connected to a first electrode of the fifteenth transistor M15. A gate of the fifteenth transistor M15 is connected to the second signal terminal CB1, and a second electrode of the fifteenth transistor M15 is connected to the fourth node P4. A first terminal of the third capacitor C3 is connected to the gate of the thirteenth transistor M13, and a second terminal of the third capacitor C3 is connected to the first electrode of the thirteenth transistor M13. A first terminal of the fourth capacitor C4 is connected to the gate of the twelfth transistor M12, a second terminal of the fourth capacitor C4 is connected to the first electrode of the twelfth transistor M12.

Referring to FIGS. 4 and 5, an operating process of the shift register of the gate driver GOA at least comprises a phase 1, a phase 2, a phase 3, a phase 4, a phase 5-a, and a phase 5-b. In phase 1, that is, when a signal at the starting signal input terminal STV1 is at a low voltage level, a signal at the clock signal terminal CK1 is at a low voltage level, and a signal at the second signal terminal CB1 is at a high voltage level, then an output signal at the signal output terminal Gate output is at a high voltage level. In phase 2, that is, when a signal at the starting signal input terminal STV1 is at a high voltage level, a signal at the clock signal terminal CK1 is at a high voltage level, and a signal at the second signal terminal CB1 is at a low voltage level, then an output signal at the signal output terminal Gate output is at a low voltage level. In phase 3, that is, when a signal at the starting signal input terminal STV1 is at a high voltage level, a signal at the clock signal terminal CK1 is at a low voltage level, and a signal at the second signal terminal CB1 is at a high voltage level, then an output signal at the signal output terminal Gate output is at a high voltage level. In phase 4, that is, when a signal at the starting signal input terminal STV1 is at a high voltage level, a signal at the clock signal terminal CK1 is at a high voltage level, and a signal at the second signal terminal CB1 is at a low voltage level, then an output signal at the signal output terminal Gate output is at a high voltage level. In phase 5-a, that is, when a signal at the starting signal input terminal STV1 is at a high voltage level, a signal at the clock signal terminal CK1 is at a high voltage level, and a signal at the second signal terminal CB1 is at a low voltage level, then an output signal at the signal output terminal Gate output is a synchronous driving signal. In phase 5-b, that is, when a signal at the starting signal input terminal STV1 is at a high voltage level, a signal at the clock signal terminal CK1 is at a high voltage level, and a signal at the second signal terminal CB1 is at a low voltage level, then an output signal at the signal output terminal Gate output is a synchronous driving signal.

The shift register shown in FIG. 4 is applied to the gate driver GOA in this embodiment. For example, when the shift register shown in FIG. 4 is applied to the gate drivers GOA(Gn) and GOA (Gn+1) shown in FIG. 1, the signal output terminal Gate Output of the shift register in the gate driver GOA(Gn) is connected to the first input terminal of the delay unit 101, and the starting signal input terminal STV1 of the shift register in the gate driver GOA (Gn+1) is connected to the first output terminal of the delay unit 101.

In this embodiment, the first transistor M1 to the fifteenth transistor M15 are a P-type transistor each, but the present disclosure is not limited thereto.

In the driving circuit provided in this embodiment, the first input terminal of the delay unit is connected to the corresponding previous gate driver, the first output terminal of the delay unit is connected to the corresponding subsequent gate driver. The delay unit outputs a starting signal for enabling the subsequent gate driver to the subsequent gate driver after a predetermined time elapses since the previous gate driver outputs a driving signal. The delay unit provided by this embodiment achieves shift registering with interval time between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

Second Embodiment

This embodiment provides a touch display panel, comprising the driving circuit provided in the first embodiment, as for the detailed content, reference may be made to the description in the first embodiment, no more details are repeated here.

In the touch display panel provided in this embodiment, the first input terminal of the delay unit is connected to the corresponding previous gate driver, the first output terminal of the delay unit is connected to the corresponding subsequent gate driver. The delay unit outputs a starting signal for enabling the subsequent gate driver to the subsequent gate driver after a predetermined time elapses since the previous gate driver outputs a driving signal. The delay unit provided by this embodiment achieves shift registering with interval time between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

Third Embodiment

This embodiment provides a touch display device, comprising the touch display panel provided in the second embodiment, as for the detailed content, reference may be made to the description in the second embodiment, no more details are repeated here.

In the touch display device provided in this embodiment, the first input terminal of the delay unit is connected to the corresponding previous gate driver, the first output terminal of the delay unit is connected to the corresponding subsequent gate driver. The delay unit outputs a starting signal for enabling the subsequent gate driver to the subsequent gate driver after a predetermined time elapses since the previous gate driver outputs a driving signal. The delay unit provided by this embodiment achieves shift registering with interval time between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

Fourth Embodiment

This embodiment provides a driving method of a driving circuit, comprising the driving circuit provided in the first embodiment, as for the detailed content, reference may be made to the description in the first embodiment, no more details are repeated here.

Figure 6:
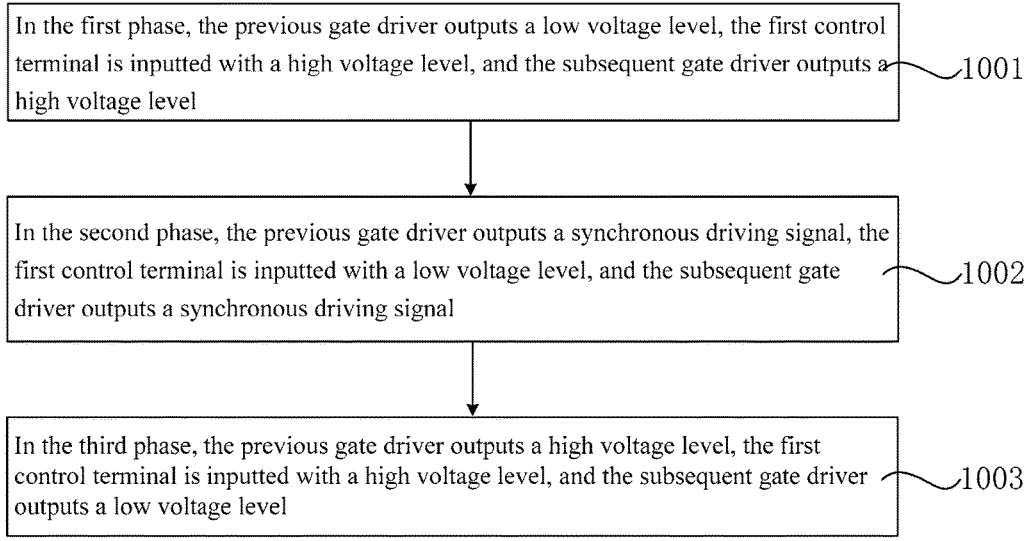
FIG. 6 is a flow chart of a driving method of a driving circuit provided by a fourth embodiment of the present disclosure.

FIG. 6 is a flow chart of a driving method of a driving circuit provided by a fourth embodiment of the present disclosure. As shown in FIG. 6, the driving method comprises steps 1001 to 1003, wherein the first voltage terminal VSS in the driving circuit is at a low voltage level.

In step 1001 (i.e., the first phase), the previous gate driver outputs a low voltage level, the first control terminal is inputted with a high voltage level, and the subsequent gate driver outputs a high voltage level.

In step 1002 (i.e., the second phase), the previous gate driver outputs a synchronous driving signal, the first control terminal is inputted with a low voltage level, and the subsequent gate driver outputs a synchronous driving signal.

In step 1003 (i.e., the third phase), the previous gate driver outputs a high voltage level, the first control terminal is inputted with a high voltage level, and the subsequent gate driver outputs a low voltage level.

In this embodiment, a touch-control phase is further comprised between the first phase and the second phase, in the touch-control phase, the previous gate driver outputs a synchronous driving signal, the first control terminal is inputted with a high level, and the subsequent gate driver outputs a synchronous driving signal, a duration of the touch-control phase is the predetermined time.

Figure 7:
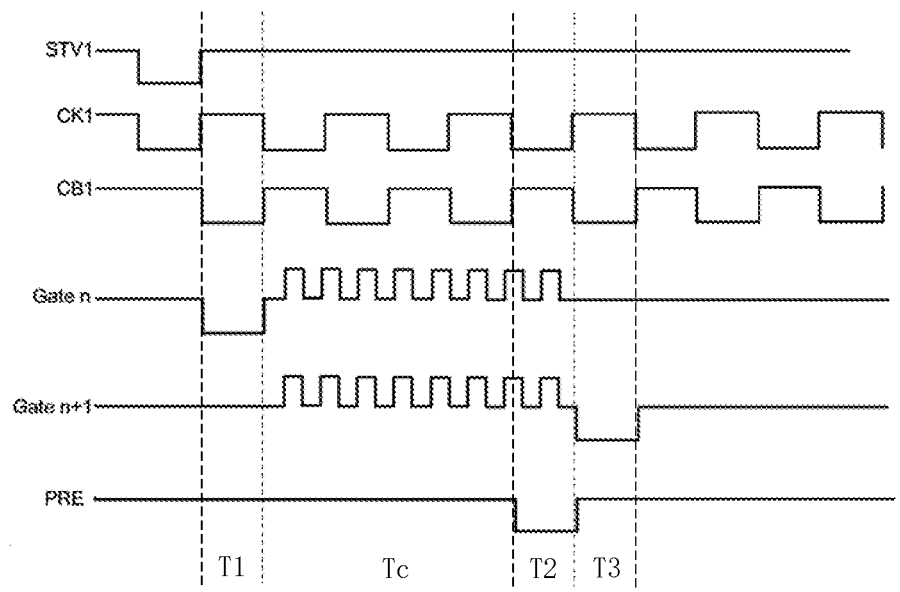
FIG. 7 is an operating timing diagram of a driving circuit provided by the fourth embodiment of the present disclosure.

FIG. 7 is an operating timing diagram of a driving method of a driving circuit provided by the fourth embodiment of the present disclosure. As shown in FIG. 7, in the first phase T1, the signal Gate n outputted by the previous gate driver is at a low voltage level, the signal at the first control terminal PRE of the delay unit corresponding to the previous gate driver is at a high voltage level, the first transistor M1 of the delay unit is turned on, the first node P1 is at a low voltage level, the second transistor M2 is turned on, the signal Gate n+1 outputted by the subsequent gate driver is at a high voltage level. In the touch-control phase Tc, the signal Gate n outputted by the previous gate driver is a synchronous driving signal, the signal at the first control terminal PRE of the delay unit corresponding to the previous gate driver is at a high voltage level, the signal Gate n+1 outputted by the subsequent gate driver is a synchronous driving signal, in this case, the touch driving circuit outputs a touch-control driving signal to the touch display device, to form a touch-control time period after the previous gate driver outputs a driving signal and before the subsequent gate driver is enabled, so as to ensure that the touch display panel can also achieve a touch-control function with high precision on the premise of achieving a display function of high resolution. Optionally, the synchronous driving signal and the touch-control driving signal are the same. The aforesaid voltage signals Gate n and Gate n+1 synchronously drive along with the touch-control electrodes, to ensure that the operating current of the light emitting device OLED is consistent with that in a normal light emitting status, and further ensures that the touch-control driving in the touch-control phase does not have any affect on the light emitting of the light emitting device OLED at all.

In this embodiment, in the second phase T2, the signal Gate n outputted by the previous gate driver is a synchronous driving signal, the signal at the first control terminal PRE of the delay unit corresponding to the previous gate driver is at a low voltage level, in this case, the first output terminal of the delay unit outputs a low voltage level to the shift register of the subsequent driver GOA (Gn+1), this low voltage level is a starting signal STV1 used for enabling the shift register of the subsequent gate driver GOA (Gn+1), so that the shift register of the subsequent gate driver GOA (Gn+1) starts to operate, in this case, the signal Gate n+1 outputted by the shift register of the subsequent gate driver GOA (Gn+1) is a synchronous driving signal. In the third phase T3, the signal Gate n outputted by the shift register of the previous gate driver is at a high voltage level, the signal at the first control terminal PRE of the delay unit corresponding to the previous gate driver is at a high voltage level, the shift register of the subsequent gate driver GOA (Gn+1) starts to operate and outputs an output signal Gate n+1 of a low voltage level.

In the driving method for a driving circuit provided by this embodiment, the first input terminal of the delay unit is connected to the corresponding previous gate driver, the first output terminal of the delay unit is connected to the corresponding subsequent gate driver. The delay unit outputs a starting signal for enabling the subsequent gate driver to the subsequent gate driver after a predetermined time elapses since the previous gate driver outputs a driving signal. The delay unit provided by this embodiment achieves shift registering with interval time between the previous gate driver and the subsequent gate driver, to form a touch-control time period after the previous gate driver outputs a driving signal and before the subsequent gate driver is enabled, so as to ensure that the touch display panel can also achieve a touch-control function with high precision on the premise of achieving a display function of high resolution.

It is to be understood that the above embodiments are merely exemplary embodiments for the purpose of illustrating the principles of the present disclosure, however, the present disclosure is not limited thereto. For those of ordinary skill in the art, various modifications and improvements may be made without departing from the spirit and substance of the present disclosure, and these modifications and improvements are also considered as being within the protection scope of the present disclosure.

What is claimed is:

1. A driving circuit, comprising a plurality of gate drivers and a plurality of delay units, each of the plurality of gate drivers including at least one shift register, each of the plurality of delay units being disposed between two adjacent gate drivers among the plurality of gate drivers, a first input terminal of each delay unit being connected to a previous gate driver of the two adjacent gate drivers, a first output terminal of each delay unit being connected to a subsequent gate driver of the two adjacent gate drivers, each delay unit being provided with a first voltage terminal and a first control terminal;

each delay unit being configured to output a starting signal for enabling the subsequent gate driver to the subsequent gate driver after a predetermined time elapses since the previous gate driver outputs a driving signal, the predetermined time being used for touch-control driving;

wherein each delay unit comprises an input module and an output module;

the input module is respectively connected to the first input terminal, the first voltage terminal, and a first node of a respective delay unit, and configured to control a potential of the first node according to signals inputted from the first input terminal and the first voltage terminal;

the output module is respectively connected to the first node, the first control terminal, and the first output terminal of the respective delay unit, and configured to control a signal outputted from the first output terminal according to a signal inputted from the first control terminal under control of the potential of the first node, the input module comprises a first transistor, a gate of the first transistor is connected to the first input terminal of the respective delay unit, a first electrode of the first transistor is connected to the first voltage terminal of the respective delay unit, and a second electrode of the first transistor is connected to the first node of the respective delay unit.

2. The driving circuit according to claim 1, wherein the output module comprises a second transistor and a first capacitor;

a gate of the second transistor is connected to the first node of the respective delay unit, a first electrode of the second transistor is connected to the first control terminal of the respective delay unit, and a second electrode of the second transistor is connected to the first output terminal of the respective delay unit;

a first terminal of the first capacitor is connected to the gate of the second transistor, and a second terminal of the first capacitor is connected to the second electrode of the second transistor.

3. The driving circuit according to claim 1, wherein each shift register comprises a starting signal input terminal and a signal output terminal, the signal output terminal performs an output according to a signal provided by the starting signal input terminal, and as to the two adjacent gate drivers, the signal output terminal of the shift register of the previous gate driver is connected to the first input terminal of the delay unit corresponding to the two adjacent gate drivers, a starting signal input terminal of the shift register of the subsequent gate driver is connected to the first output terminal of the delay unit corresponding to the two adjacent gate drivers.

4. The driving circuit according to claim 1, wherein each of the plurality of gate drivers comprises a first output terminal, a second output terminal, and a third output terminal, a first output terminal of a previous gate driver of the two adjacent gate drivers is connected to the first input terminal of the delay unit corresponding to the two adjacent gate drivers, and each of the plurality of gate drivers is configured to drive a pixel circuit, the pixel circuit including a third transistor, a fourth transistor, a fifth transistor, a sixth transistor, a seventh transistor, an eighth transistor, a second capacitor, and a light emitting device, a gate of the third transistor is connected to the second output terminal of each of the plurality of gate drivers, a first electrode of the third transistor is connected to an initialization signal input terminal of the pixel circuit, and a second electrode of the third transistor is connected to a second node of the pixel circuit;

a gate of the fourth transistor is connected to the first output terminal of each of the plurality of gate drivers, a first electrode of the fourth transistor is connected to the second node of the pixel circuit, and a second electrode of the fourth transistor is connected to a sixth node of the pixel circuit;

a gate of the fifth transistor is connected to the second node of the pixel circuit, a first electrode of the fifth transistor is connected to a fifth node of the pixel circuit, and a second electrode of the fifth transistor is connected to the sixth node of the pixel circuit;

a gate of the sixth transistor is connected to the third output terminal of each of the plurality of gate drivers, a first electrode of the sixth transistor is connected to a first power supply terminal of the pixel circuit, and a second electrode of the sixth transistor is connected to the fifth node of the pixel circuit;

a gate of the seventh transistor is connected to the first output terminal of each of the plurality of gate drivers, a first electrode of the seventh transistor is connected to a data input terminal of the pixel circuit, and a second electrode of the seventh transistor is connected to the fifth node of the pixel circuit;

a gate of the eighth transistor is connected to the third output terminal of each of the plurality of gate drivers, a first electrode of the eighth transistor is connected to the sixth node of the pixel circuit, and a second electrode of the eighth transistor is connected to a first terminal of the light emitting device;

a first terminal of the second capacitor is connected to the second node of the pixel circuit, and a second terminal of the second capacitor is connected to the first power supply terminal of the pixel circuit;

a second terminal of the light emitting device is connected to a second power supply terminal of the pixel circuit.

5. The driving circuit according to claim 1, wherein the first transistor is a P-type transistor.

6. The driving circuit according to claim 2, wherein the second transistor is a P-type transistor.

7. The driving circuit according to claim 4, wherein each of the third transistor to the eighth transistor is a P-type transistor.

8. A touch display panel, comprising the driving circuit according to claim 1.

9. A touch display device, comprising the touch display panel according to claim 8.

10. A driving method of a driving circuit, the driver circuit comprising the driving circuit according to claim 1, wherein the first voltage terminal is at a low voltage level, the driving method comprises:

in a first phase, the previous gate driver outputs a low voltage level, the first control terminal is inputted with a high voltage level, and the subsequent gate driver outputs a high voltage level;

in a second phase, the previous gate driver outputs a synchronous driving signal, the first control terminal is inputted with a low voltage level, and the subsequent gate driver outputs a synchronous driving signal; and in a third phase, the previous gate driver outputs a high voltage level, the first control terminal is inputted with a high voltage level, and the subsequent gate driver outputs a low voltage level.

11. The driving method of a driving circuit according to claim 10, wherein the following is further comprised between the first phase and the second phase:

a touch-control phase, the previous gate driver outputs a synchronous driving signal, the first control terminal is inputted with a high voltage level, and the subsequent gate driver outputs a synchronous driving signal, a duration of the touch-control phase is the predetermined time.

12. The driving method of a driving circuit according to claim 10, wherein the synchronous driving signal is the same as a touch-control driving signal.

13. The driving method of a driving circuit according to claim 10, wherein the input module comprises a first transistor;

a gate of the first transistor is connected to the first input terminal of the respective delay unit, a first electrode of the first transistor is connected to the first voltage terminal of the respective delay unit, and a second electrode of the first transistor is connected to the first node of the respective delay unit.

14. The driving method of a driving circuit according to claim 10, wherein the output module comprises a second transistor and a first capacitor;

a gate of the second transistor is connected to the first node of the respective delay unit, a first electrode of the second transistor is connected to the first control terminal of the respective delay unit, and a second electrode of the second transistor is connected to the first output terminal of the respective delay unit;

a first terminal of the first capacitor is connected to the gate of the second transistor, and a second terminal of the first capacitor is connected to the second electrode of the second transistor.

15. The driving method of a driving circuit according to claim 10, wherein each shift register comprises a starting signal input terminal and a signal output terminal, the signal output terminal performs an output according to a signal provided by the starting signal input terminal, and as to the two adjacent gate drivers, the signal output terminal of the shift register of the previous gate driver is connected to the first input terminal of the delay unit corresponding to the two adjacent gate drivers, a starting signal input terminal of the shift register of the subsequent gate driver is connected to the first output terminal of the delay unit corresponding to the two adjacent gate drivers.

16. The driving method of a driving circuit according to claim 10, wherein each of the plurality of gate drivers comprises a first output terminal, a second output terminal, and a third output terminal, a first output terminal of a previous gate driver of the two adjacent gate drivers is connected to the first input terminal of the delay unit corresponding to the two adjacent gate drivers, and each of the plurality of gate drivers is configured to drive a pixel circuit, the pixel circuit including a third transistor, a fourth transistor, a fifth transistor, a sixth transistor, a seventh transistor, an eighth transistor, a second capacitor, and a light emitting device, a gate of the third transistor is connected to the second output terminal of each of the plurality of gate drivers, a first electrode of the third transistor is connected to an initialization signal input terminal of the pixel circuit, and a second electrode of the third transistor is connected to a second node of the pixel circuit;

a gate of the fourth transistor is connected to the first output terminal of each of the plurality of gate drivers, a first electrode of the fourth transistor is connected to the second node of the pixel circuit, and a second electrode of the fourth transistor is connected to a sixth node of the pixel circuit;

a gate of the fifth transistor is connected to the second node of the pixel circuit, a first electrode of the fifth transistor is connected to a fifth node of the pixel circuit, and a second electrode of the fifth transistor is connected to the sixth node of the pixel circuit;

a gate of the sixth transistor is connected to the third output terminal of each of the plurality of gate drivers, a first electrode of the sixth transistor is connected to a first power supply terminal of the pixel circuit, and a second electrode of the sixth transistor is connected to the fifth node of the pixel circuit;

a gate of the seventh transistor is connected to the first output terminal of each of the plurality of gate drivers, a first electrode of the seventh transistor is connected to a data input terminal of the pixel circuit, and a second electrode of the seventh transistor is connected to the fifth node of the pixel circuit;

a gate of the eighth transistor is connected to the third output terminal of each of the plurality of gate drivers, a first electrode of the eighth transistor is connected to the sixth node of the pixel circuit, and a second electrode of the eighth transistor is connected to a first terminal of the light emitting device;

a first terminal of the second capacitor is connected to the second node of the pixel circuit, and a second terminal of the second capacitor is connected to the first power supply terminal of the pixel circuit;

a second terminal of the light emitting device is connected to a second power supply terminal of the pixel circuit.

17. The driving method of a driving circuit according to claim 13, wherein the first transistor is a P-type transistor.

* * * * *